I. E. LEE.
CHEESE CUTTER.
APPLICATION FILED APR. 2, 1909.
948,422.
Patented Feb. 8, 1910.
2 SHEETS—SHEET 1.
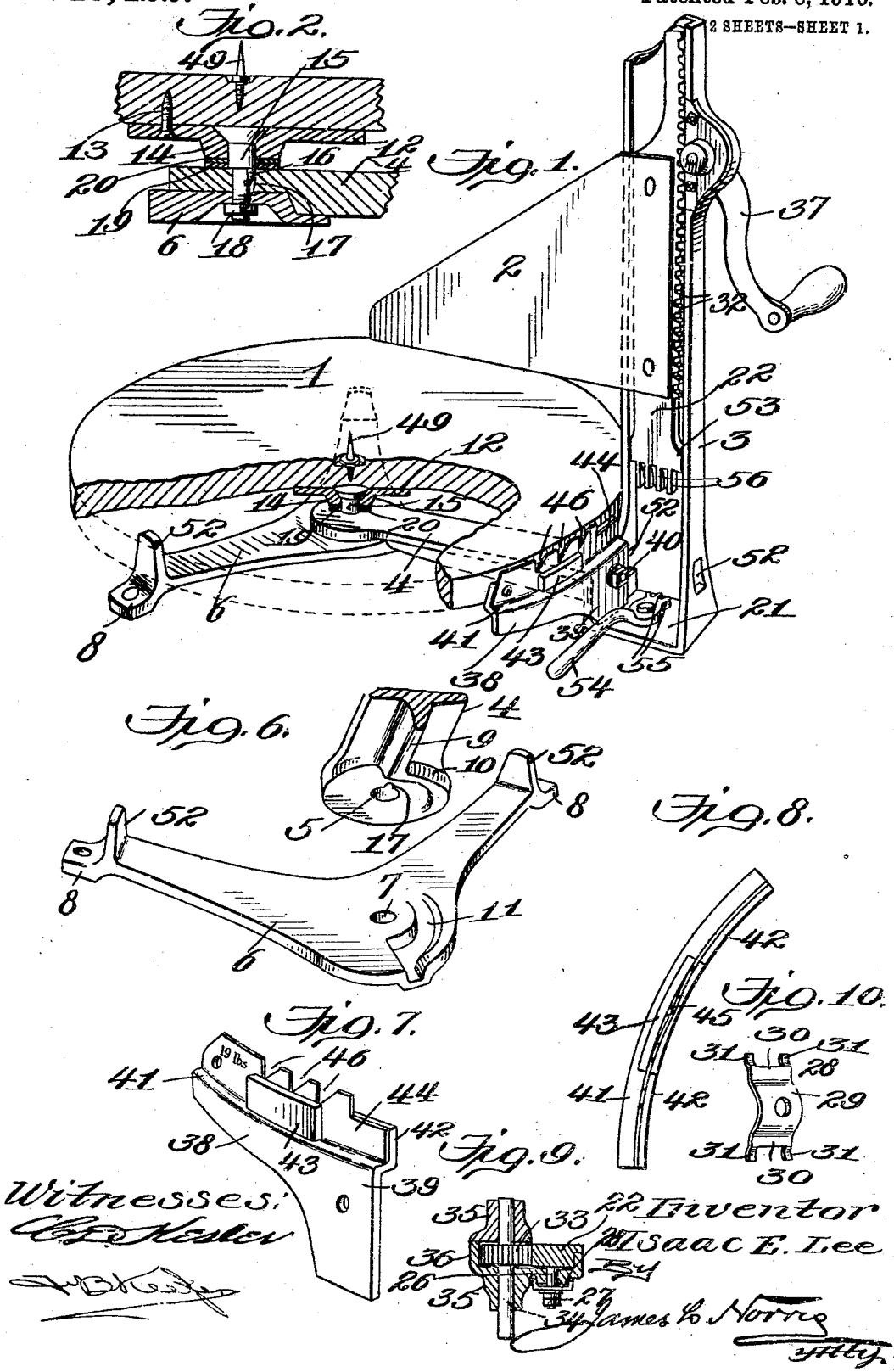
Witnesses:
Inventor
Isaac E. Lee
James L. Norris
Atty.

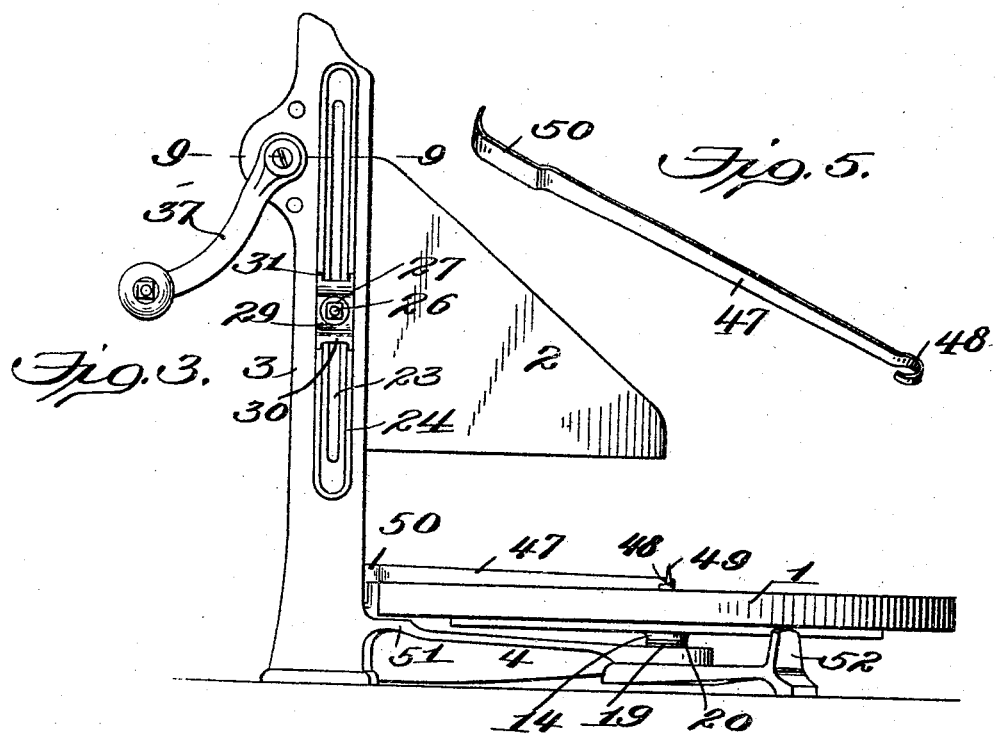
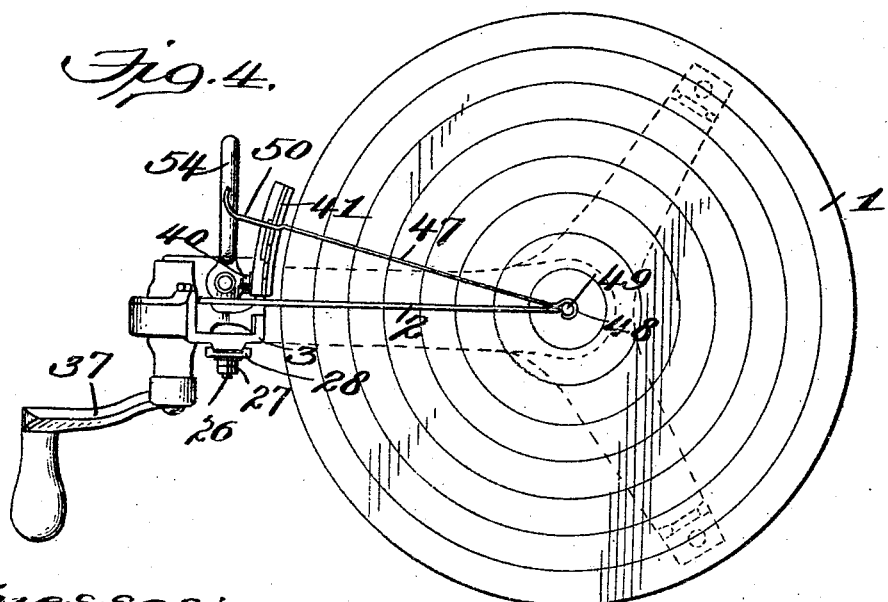

UNITED STATES PATENT OFFICE.

ISAAC EDWARD LEE, OF BROADWAY, VIRGINIA, ASSIGNOR OF FIVE-SIXTEENTHS TO CHAS. A. WITT, OF BROADWAY, VIRGINIA, AND FIVE-SIXTEENTHS TO J. F. BLACKBURN, OF HARRISONBURG, VIRGINIA.

CHEESE-CUTTER.

948,422.  Specification of Letters Patent.  Patented Feb. 8, 1910.

Application filed April 2, 1909. Serial No. 487,378.

*To all whom it may concern:*

Be it known that I, ISAAC EDWARD LEE, a citizen of the United States, residing at Broadway, in the county of Rockingham and State of Virginia, have invented new and useful Improvements in Cheese-Cutters, of which the following is a specification.

This invention relates to new and useful improvements in cheese cutters and more particularly to that type of construction in which a "drop" knife coöperating with a rotatable table is employed.

In connection with a cheese cutter of this general type one of the primary features of novelty resides particularly in details of structure and arrangement having for their object the certainty of the cutting operation, means being provided whereby the table is firmly held against movement during such operation in order that a slice of cheese may be cut with absolute accuracy.

The invention also includes novel means for holding the drop knife normally against movement, such means comprising more particularly a friction device.

The invention includes as a further novel feature a gage holding attachment in which a gage is removably held. It will be understood that cylindrical cheeses are made of different proportions as to height and diameter and have correspondingly varying weights. Therefore, one gage is not applicable to all cheeses and it has been found more practical to employ a removable individual gage than a composite gage applicable to all cheeses.

The invention includes as a further novel feature means whereby the cheese cutting knife may be given a radial drawing movement at the lower termination of its stroke for the purpose of cutting the cheese cloth but whereby during the operative stroke of the knife no radial play is allowed.

The structural details of the improvement will be set forth at length in the following description which is to be read in connection with the accompanying drawings, the latter illustrating a preferred and advantageous embodiment of the invention, while the novel features of the invention will be described in the claims appended at the end of the description.

In the said drawings: Figure 1 is a perspective view of a cheese cutter constructed in accordance with the present invention, the supporting platform being partly broken away in order to more clearly show certain elements of the structure. Fig. 2 is a fragmentary sectional view along a diameter of the platform and illustrating the adjuncts thereof. Fig. 3 is a side elevation of the cheese cutter. Fig. 4 is a top plan view thereof. Fig. 5 is a detail perspective view of a gage stop. Fig. 6 is a detail perspective view illustrating in detached relation two coöperating elements of the platform support. Fig. 7 is a detail perspective view of the gage holder and the gage therein. Fig. 8 is a top plan view thereof. Fig. 9 is a cross section on the line 9—9 of Fig. 3. Fig. 10 is a detail perspective view of a friction device for holding the drop knife normally against movement.

Similar characters of reference designate corresponding parts throughout the several views.

The present cheese cutter comprises essentially a supporting platform, as 1, and a drop knife, as 2, which is disposed radially of the platform and moves in a vertical plane toward and away from the same.

At one side of the platform 1 a standard, as 3, is arranged. This standard has projecting from its lower end an arm, as 4, which inclines downwardly in the manner shown in Fig. 3 and has its end portion provided with an opening, as 5. The end portion of the arm 4 rests upon the central portion of a substantially V-shaped member, as 6, the latter also having an opening, as 7, which alines with the opening 5 and having at its ends apertured lugs, as 8, by which the member 6 may be attached to a suitable support, as a table. The arm 4 has on its under face a longitudinal rib, as 9, which terminates in a curved inclined rib, as 10. The ribs 9 and 10 fit in a conformably shaped recess, as 11, which is formed in the upper face of the member 6 and by virtue of such relation the arm 4 and the member 6 are held against relative rotation. Said arm and said member form a support for the platform 1 which carries on its under face a plate, as 12, secured by attachment screws, as 13, and having a centrally apertured boss, as 14, in which is swiveled a bolt, as 15. The bolt 15 extends through the openings 5 and 7 and is provided at one side thereof with a rib, as 16, which fits in a recess, as 17, in one side of the opening 5. By virtue of the rib 16, relative rotation of the bolt and of the arm 4 and member 6 is prevented. A nut, as 18, is threaded on the under face of the bolt and serves to bind the parts. For the purpose of preventing too free rotation of the platform 1 and at the same time to allow the platform to yield under pressure for a purpose to be described, friction brake means is provided and such means comprises two washers, as 19 and 20, which are interposed between the arm 4 and the boss 14. The lower washer 19 is preferably of metal and the upper washer 20 is preferably of leather, this material being employed because it permits of the yielding of the platform and at the same time bears with a material degree of friction upon the surface of the boss 14 when the platform is rotated and thus retards or prevents too free rotation.

The standard 3 is of substantial U shape in cross section and has at its lower end an apertured flange, as 21, for attachment to the supporting table or other structure. The knife 2 is carried upon a rack bar, as 22, the latter fitting between the side flanges of the standard 3 and being guided thereby in its vertical movement. Said standard has its wall opposite the knife 2 formed with a longitudinal slot, as 23, which is bounded by a circumscribing rib 24. The rack bar 22 is provided with a bolt, as 26, which projects through the slot 23 and has on its end a suitable nut, as 27. The means for holding the rack bar normally against movement comprises a spring friction shoe which is illustrated more particularly in Fig. 10. Such shoe, designated generally as 28, has a central bow-shaped portion, as 29, through which the bolt 26 passes and which terminates in bearing flanges, as 30. The flanges 30 bear with a material degree of friction against the rib 24 and are constructed at their ends with projecting tongues, as 31, which engage the sides of the rib 24 and thereby prevent rotation of the member 28 on the bolt 26. The bar 22 fits snugly in a channel of the standard 3 in such manner that no unnecessary loose play is allowed. Rack teeth, as 32, are provided on the rear face of the bar and are engaged by a pinion, as 33. The pinion 33 is mounted upon a transverse shaft, as 34, which is journaled in offset bearings, as 35. The bearings 35 are provided on the rear side of the standard 3 and one of the bearings has a web, as 36, which incloses the pinion 33 and forms in effect a casing therefor.

The other bearing fits against the web 36 and is removably attached to the standard 3, as shown in Fig. 1. The pinion 33 is rotated by a crank handle, as 37, which is fitted upon a projecting end portion of the shaft 34.

The gage holding attachment is shown more particularly in Figs. 7 and 8 and comprises a curved member, as 38, which has a depending apertured lug 39. The lug 39 is secured within the lower end portion of the standard 3 by a bolt and nut fastening 40 and the member 38 projects at one side of said standard in the manner shown in Fig. 1. The member 38 is provided on its upper side with a ledge, as 41, and the latter is in turn formed with lugs, as 42 and 43. The lugs 42 are arranged in spaced circumferentially alined relation and the single lug 43 is disposed in line with the space between the lugs 42 and in staggered relation to the latter. The arrangement of the lugs 42 and 43 provides for the reception of a gage, as 44. The gage 44 comprises a section of resilient metal, the end portions of which bear against the outer sides of the lugs 42 and the central portion of which bears against the inner side of the lug 43 which is further provided with a projection, as 45, to engage said central portion with pressure and to increase the frictional binding action thereof. It will be understood that when the size and weight of the cheese is varied the gages are correspondingly varied. The gage 44 is formed with a series of notches, as 46, which are provided to receive what is for convenience termed a gage stop, as 47. The latter is in the nature of an arm which is disposed radially of the platform 1 and which has its inner end of substantial hook shape, as at 48, to engage a pin, as 49, which is arranged at the center of the platform 1. The outer end of the end portion of the gage stop 47 projects beyond the platform 1 and is formed with a handle portion, as 50.

In using the device a thin slice of the cheese has to be cut before the same is positioned upon the platform in order that a space may be allowed for the gage stop 47. This slice may be of just sufficient size to provide a narrow kerf in which said gage stop fits. After the cheese has been placed upon the platform, assuming that it is desired to cut a slice of some given size, the gage stop is moved about the pin 49 as a pivot until its end portion 50 is over the notch in the gage 44 which indicates the given weight. The end portion 50 is then dropped into said notch. This action is readily had by virtue of the loose connection between the pin 49 and the hook-shaped end portion 48 of the gage stop. The platform 1 is then rotated until the side of the cheese abuts the gage stop 47 which thereby limits further rotation. The crank handle 37 is then turned to cause the knife 2 to move downwardly into and through the cheese. This puts some degree of pressure upon the rear side of the platform and in order that any oscillation of the platform which might be otherwise incident to such pressure, may be prevented, a ledge, as 51, is provided upon the arm 4 at its inner end. The platform normally does not contact with the ledge 51 but is forced into contact therewith and thereby firmly held by the pressure incident to the downward movement of the knife 2. As a further means for steadying the platform 1, lugs, as 52, are provided at the ends of the legs of the member 6 and are disposed near but normally out of contact with the under face of the platform. The yielding of the platform which is necessary in order to allow the contact with the ledge 51 is provided for by the leather washer 20, which serves also as a friction brake to prevent too free a rotation of said platform.

It has been stated that the invention includes as a further novel feature, means for causing a radial drawing movement of the cutting knife at the lower termination of its stroke. Toward this end the standard 3 has its side flanges provided near their lower ends with alining recesses or openings 52 to accommodate projections 53 on the bar 22 near its lower end. These projections bear against the side flanges during the stroke of the bar 22 and consequently hold the latter and therewith the knife 2 against radial play. But when the projections 53 are in line with the openings 52, a certain degree of radial play is allowed. The radial movement of the knife 2 under the circumstances indicated, is had by means of a laterally projecting operating lever 54 which is pivoted on the base of the standard 3 and which has a toothed working portion, as 55, to engage with teeth 56 formed in the outer side face of the bar 22 at the lower end thereof, when said bar is in its lowermost position. When the teeth 55 are in engagement with the teeth 56, the lever 54 is oscillated and thus radial reciprocations of the knife are produced whereby the fabric secured to the under face of the cheese block, is cut.

Having fully described my invention, I claim:

1. In a cheese cutter, in combination, a pivoted platform, a knife movable toward and away from the same, means supporting the platform, a leather washer arranged at the center of the supporting means and interposed between the same and the platform and a ledge arranged under the platform, at one side thereof, and normally out of contact therewith, the platform yielding into contact with the ledge as a result of the pressure incident to the operation of the knife, and the leather washer providing for such yielding of the platform.

2. In a cheese cutter, in combination, an arm having a rib on one of its faces, a member having a recess to receive the arm and the rib, a pivot bolt passing through the arm and the member and connecting the same, means positively holding the pivot bolt against rotation, a platform, swivel means connecting the platform and pivot bolt, and a knife movable toward and away from the platform.

3. In a cheese cutter, in combination, a rotatable platform, a standard arranged at one side thereof, a bar movable longitudinally of the standard, friction brake means structurally independent of the bar and the standard to hold the bar normally against movement, and a knife carried by the bar.

4. In a cheese cutter, in combination, a rotatable platform, a standard arranged at one side thereof and having a slotted wall, a bar movable longitudinally of the standard and having a bolt projecting through the slot, a nut upon the bolt, a spring shoe held by the nut and bearing against the standard and a knife carried by the bar.

5. In a cheese cutter, in combination, a rotatable platform, a knife movable toward and away from the same, a gage located adjacent the platform at one side of the knife and a gage stop pivoted at the center of the platform and movable with respect thereto and to the gage.

6. In a cheese cutter, in combination, a rotatable platform, a knife movable toward and away from the same, a gage holding attachment located adjacent the platform at one side of the knife and a gage member removably held by said attachment.

7. In a cheese cutter, in combination, a rotatable platform, a knife movable toward and away from the same, a gage holding attachment located adjacent the platform at one side of the knife and comprising a member having at least three separated lugs arranged in staggered relation and a resilient gage member fitted into the space between the lugs and frictionally held by the latter.

8. In a cheese cutter, in combination, a platform, a vertical standard at one side thereof and provided near its lower end with alining openings, a bar movable axially of the standard and provided with projections which aline with the openings in the lowermost position of the bar, a knife fixed to the bar, means for causing movement of the bar axially of the standard, and means for moving the bar laterally at the lower termination of its axial movement to cause a radial drawing movement of the knife.

9. In a cheese cutter, in combination, a rotatable platform, a knife movable toward and away from the same, the platform having a central pin, a gage member located adjacent the periphery of the platform and having notches, and a gage stop pivotally related to the central pin and movable with respect to said platform, said stop being positioned with respect to the gage member in any desired one of the notches.

In testimony whereof I have hereunto set my hand in presence of two subscribing witnesses.

ISAAC EDWARD LEE.

Witnesses:
CLAUDE KNOPP,
F. C. HEDLINZER.